US012783955B2

(12) United States Patent
Chen et al.

(10) Patent No.: US 12,783,955 B2
(45) Date of Patent: Nov. 3, 2026

(54) VERIFIABLE MLOps TO TRAIN ML MODELS ON AUTONOMOUS ENVIRONMENTS

(71) Applicant: Red Hat, Inc., Raleigh, NC (US)

(72) Inventors: Huamin Chen, Newton, MA (US); Marcelo Amaral, Tokyo (JP); Chen Wang, Chappaqua, NY (US); Sunyanan Choochotkaew, Tokyo (JP); Eun Kyung Lee, Bedford Corners, NY (US); Parul Singh, Cambridge, MA (US); Kaiyi Liu, Toronto (CA)

(73) Assignee: Red Hat, Inc., Raleigh, NC (US)

( * ) Notice: Subject to any disclaimer, the term of this patent is extended or adjusted under 35 U.S.C. 154(b) by 617 days.

(21) Appl. No.: 18/362,684

(22) Filed: Jul. 31, 2023

(65) Prior Publication Data

US 2025/0045623 A1 Feb. 6, 2025

(51) Int. Cl.
*G06F 21/00* (2013.01)
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS 9,503,466 B2 11/2016 Vasseur et al.
12,493,463 B1 * 12/2025 Mehta ...................... G06F 8/71
2020/0218940 A1 * 7/2020 Anglin .................. H04L 9/0637
2020/0410390 A1 * 12/2020 Fu ......................... G06F 11/302
2021/0110219 A1 * 4/2021 Ouellet ................. G06F 18/211
2021/0264321 A1 * 8/2021 Xiang .................... G06N 20/20
2021/0390455 A1 * 12/2021 Schierz .................. G06N 20/00
2022/0326930 A1 10/2022 Nandavar et al.
2023/0064421 A1 3/2023 Mohanty et al.
2025/0118052 A1 * 4/2025 Moloney .................. G06N 3/08
2025/0148351 A1 * 5/2025 Garcia ................... G06N 20/00

OTHER PUBLICATIONS

Battina, Dhaya Sindhu, "An Intelligent Devops Platform Research and Design Based on Machine Learning", International Journal of Innovations in Engineering Research and Technology [IJIERT], vol. 6, Issue 3, Mar. 2019, pp. 68-75.

(Continued)

*Primary Examiner* — William A Corum, Jr.

(74) *Attorney, Agent, or Firm* — Womble Bond Dickinson (US) LLP

(57) ABSTRACT

Systems and methods are presented to provide a first machine learning model to a collaboration platform. The systems and methods receive a second machine learning model from the collaboration platform that indicates the second machine learning model is based on the first machine learning model. The systems and methods test the second machine learning model using criteria corresponding to the first machine learning model to determine whether the second machine learning model is valid. In turn, the systems and methods publish the second machine learning model to a repository in response to determining that the second machine learning model is valid.

20 Claims, 6 Drawing Sheets

(56) References Cited

OTHER PUBLICATIONS

Garg et al., “On Continuous Integration / Continuous Delivery for Automated Deployment of Machine Learning Models using MLOps”, downloaded from https://arxiv.org/pdf/2202.03541.pdf, Feb. 7, 2022, 4 pp total.
Haviv, Yaron, “Git-based CI / CD for Machine Learning & MLOps”, downloaded from https://www.iguazio.com/blog/git-based-ci-cd-for-machine-learning-mlops/, Jun. 22, 2020, 4 pp total.
Hewage et al., “Machine Learning Operations: A Survey on MLOps Tool Support”, downloaded from https://arxiv.org/pdf/2202.10169.pdf, Feb. 22, 2022, 12 pp total.
Karamitsos et al., “Applying DevOps Practices of Continuous Automation for Machine Learning”, Information, vol. 11, Issue 7, Jul. 13, 2020, 15 pp total.

* cited by examiner

VERIFIABLE MLOps TO TRAIN ML MODELS ON AUTONOMOUS ENVIRONMENTS

TECHNICAL FIELD

Aspects of the present disclosure relate to training machine learning (ML) models, and more particularly, to using verifiable machine learning operations (MLOps) to train ML models on autonomous environments.

BACKGROUND

A machine learning model is a mathematical representation or algorithm that is trained on data to generate predictions or decisions without being explicitly programmed. Machine learning models may be trained on historical data and patterns of system behavior to automatically detect anomalies or performance degradation. These models can learn to identify abnormal system states, such as unusual resource utilization, network bottlenecks, or unusual user behavior.

MLOps refers to the practices, processes, and tools used to streamline and operationalize machine learning workflows and models. MLOps combines principles from software engineering, DevOps (Development Operations), and data science to establish a systematic and reproducible approach to manage the entire lifecycle of machine learning models. MLOps bridges the gap between data scientists, who develop machine learning models, and IT (information technology) operations teams responsible for deploying and maintaining these models in production environments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
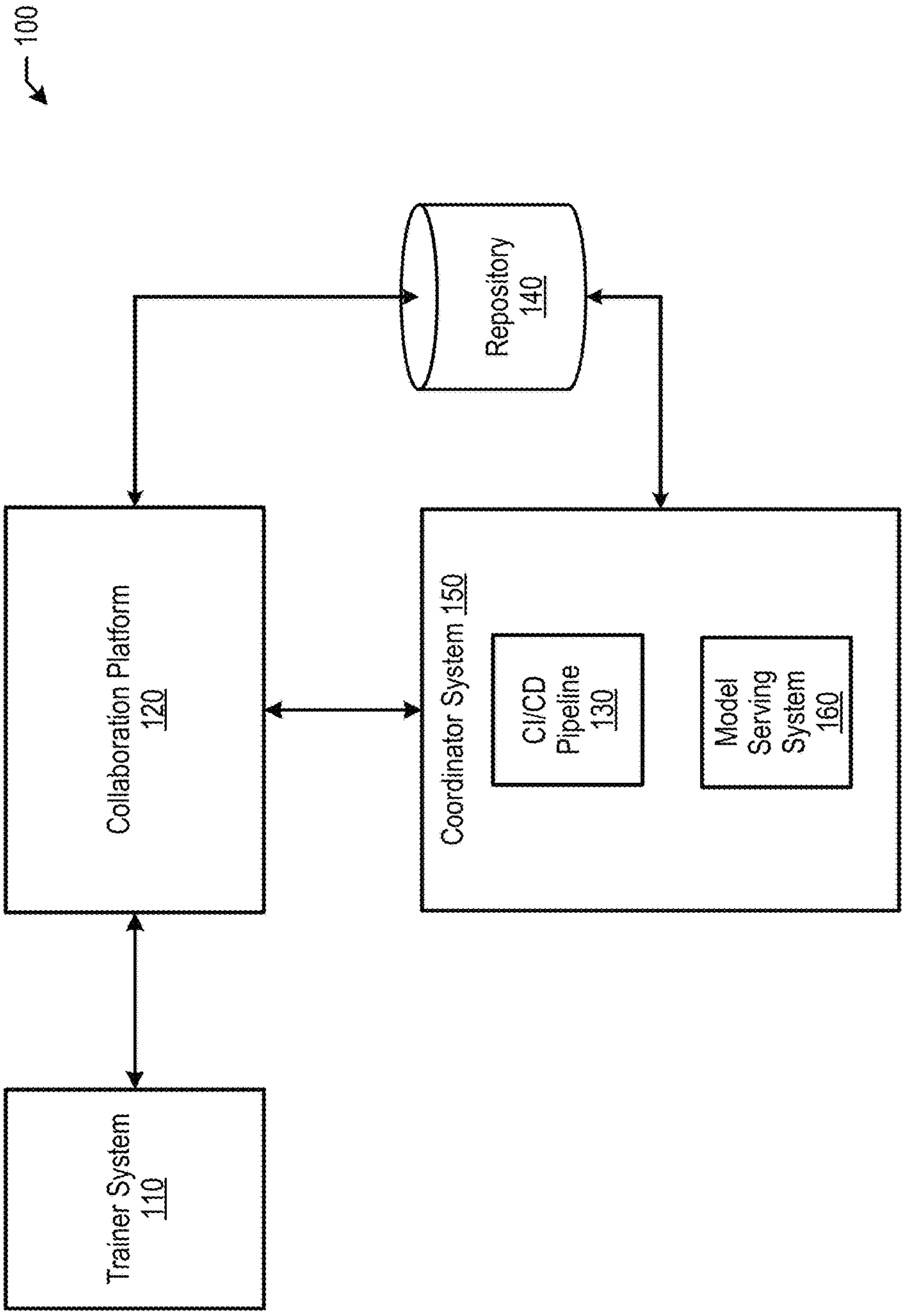
FIG. 1 is a block diagram that illustrates an example system that maintains trust and separation between different entities and their environments while training a ML model, in accordance with some embodiments of the present disclosure.

As discussed above, machine learning (ML) models may be trained on historical data and patterns of system behavior to automatically detect anomalies or performance degradation. Some approaches to train ML models include centralized training and federated learning. Centralized training refers to the approach of training ML models using a centralized server or a cluster of servers where all the training data is aggregated and processed. In centralized training, the data is collected from various sources, typically stored in a centralized database or cloud storage, and made available to a central server for training the model. The process of centralized training typically involves operations such as data collection, data preprocessing, model training, model evaluation, and model deployment. Centralized training, however, raises concerns related to data privacy and security because all the training data is collected and processed in a centralized location. For example, an entity that wishes to optimize a ML model for their proprietary platform (hardware, software, or a combination thereof), may not wish to release information describing their proprietary platform to another entity to perform the ML model centralized training.

As an alternative to centralized training, federated learning provides a decentralized approach where training is performed on multiple local devices or servers. Federated learning is a machine learning approach that enables the process of training ML models across multiple decentralized edge devices or servers without the need to share the underlying data. A challenge found with federated learning, however, is the inability to control the training process across the multiple local devices or servers when the multiple local devices are managed by multiple entities. As such, both centralized training and federated learning fall short on maintaining trust and separation between different entities and their environments, such as a software/hardware provider and a ML model coordinator system.

A ML model coordinator system, also known as a model manager system or model orchestrator system, is a component or system that oversees the deployment, monitoring, and coordination of multiple ML models within an application or an organization. The ML model coordinator system's primary function is to manage the lifecycle of ML models, ensuring their proper functioning, scalability, and efficiency. For example, a hardware vendor may develop a new processor and wish to train a currently published ML model (managed by the ML model coordinator system) for optimization on the new processor. In this example, the hardware vendor may not wish to expose the feature set of the new processor, but rather train the model independently and internally. However, when the ML model coordinator system receives an optimized ML model, the ML model coordinator system is not able to validate the optimized ML model prior to publication because the ML model coordinator system does not have the feature set of the new processor. As such, challenges arise to i) preserve both vendor and end user privacy during model training and model deployment; ii) to ensure models are trained on environments and process that can be verified and approved by the frameworks; and iii) to ensure the model integrity and accuracy when the models are submitted and eventually distributed by the ML model coordinator system.

The present disclosure addresses the above-noted and other deficiencies by using a Git Ops (operations) based MLOps process to train ML models on autonomous environments (e.g., separately controlled entities) to preserve privacy between the environments and ensure model accuracy and verification. "Git" is a distributed version control system (VCS) used in software development to manage source code and track changes. Git offers a decentralized architecture and allows developers to work offline and independently. GitOps is a software development methodology that leverages Git as the source of truth for managing and controlling the infrastructure and application deployment process. Git Ops-based MLOps is an approach that combines GitOps and MLOps principles to manage and deploy ML models in a reproducible and automated manner. In a GitOps-based MLOps workflow, the ML model, along with its associated code, configuration files, and dependencies, is version-controlled using Git. This enables tracking changes, collaborating, and maintaining a history of the model's evolution.

In some embodiments, to address the above-noted and other deficiencies, the present disclosure uses a processing device to provide a first ML model to a collaboration platform. The processing device receives a second ML model from the collaboration platform that indicates the second ML model is based on the first ML model. The processing device tests the second ML model using criteria corresponding to the first ML model to determine whether the second ML model is valid. In turn, the processing device publishes the second ML model to a repository in response to determining that the second ML model is valid.

In some embodiments, the first ML model is trained prior to being provided to the collaboration platform. In some embodiments, the processing device provides a manifest corresponding to the first ML model to the collaboration platform. The manifest includes one or more training parameters for a trainer system to retrain the first ML model to produce the second ML model. In some embodiments, the one or more training parameters instruct the trainer system to validate the first ML model prior to retraining the first ML model.

In some embodiments, the processing device is part of a coordinator system, where the coordinator system and the trainer system are controlled by separate entities. In some embodiments, the coordinator system incorporates machine learning operations (MLOps) and the collaboration platform is a GitHub platform that incorporates Git operations (GitOps).

In some embodiments, the processing device transforms categorical data corresponding to the first ML model into one or more numerical representations. The processing device tests the second ML model using the one or more numerical representations to produce test results. Based on the test results, the processing device identifies a trainer system that produced the second ML model. In some embodiments, the processing device sends an error message to the collaboration platform in response to determining that the second ML model is invalid.

As discussed herein, the present disclosure provides an approach that improves the operation of a computer system by enabling a software or hardware provider the ability to optimize existing ML models to their software or hardware platform without publicly exposing platform details. In addition, the present disclosure provides an improvement to the technological field of ML model training by automating and tracking the exchange of ML models between trainer systems and coordinator systems.

FIG. 1 is a block diagram that illustrates an example system that maintains trust and separation between different entities and their environments while training a ML model, in accordance with some embodiments of the present disclosure. As illustrated in FIG. 1, system 100 includes trainer system 110, collaboration platform 120, and coordinator system 150. Trainer system 110, such as an environment controlled by a hardware vendor entity, wishes to train/optimize a ML model managed by coordinator system 150, such as an environment controlled by a ML model coordinator system entity.

Collaboration platform 120 serves as an intermediary between trainer system 110 and coordinator system 150 to ensure privacy while also maintaining trust between the two environments. In some embodiments, collaboration platform 120 is a GitHub platform that incorporates GitOps processes, which includes storing version-controlled artifacts related to ML models, such as code, configuration files, and manifests in repository 140. In some embodiments, coordinator system 150 includes a GitOps agent or controller that is deployed in a Kubernetes cluster to continuously pull changes from repository 140 and ensure that the desired state matches the actual state of the Kubernetes infrastructure.

Coordinator system 150 includes Continuous Integration and Continuous Deployment (CI/CD) pipeline 130 and model serving system 160. CI/CD pipeline 130 automates the building, testing, and deploying of ML models. Whenever a change is made to a model or its associated files, CI/CD pipeline 130 is triggered to ensure proper testing and validation before deploying the updated model. CI/CD pipeline 130 also performs tasks such as model training, evaluation, packaging, and creating deployment artifacts (see FIG. 3 and corresponding text for further details). Model serving system 160, in some embodiments, is an open-source model serving system that is designed to simplify the deployment and serving of ML models in a scalable and efficient manner. Model serving system 160 provides a robust and production-ready infrastructure for serving models in a variety of deployment scenarios, including on-premises, cloud, and edge environments.

When trainer system 110 requests an existing ML model to train from collaboration platform 120, collaboration platform 120 retrieves the requested existing ML model and a corresponding manifest from repository 140 and sends the requested existing ML model and manifest to trainer system 110. Trainer system 110 uses the manifest to validate the requested existing ML model and to train/optimize a new ML model based on the requested existing ML model using a dataset with environment specific features known to trainer system 110, but not known to collaboration platform 120 or coordinator system 150 (see FIG. 2 and corresponding text for further details).

Once trained, trainer system 110 sends the new ML model to collaboration platform 120. Collaboration platform 120 then interfaces with coordinator system 150 to validate the new ML model. Collaboration platform 120 informs coordinator system 150 that the new ML model is based on the requested existing ML model that was sent to trainer system 110 using, for example, version control information managed by collaboration platform 120. In turn, coordinator system 150 validates the new ML model using features information, encoding information, and regression test information corresponding to the requested existing ML model. When the new model is validated, coordinator system 150 publishes the new ML model into repository 140. If the new ML model is not validated, coordinator system 150 rejects the new ML model and generates an error message (see FIG. 3 and corresponding text for further details).

Figure 2:
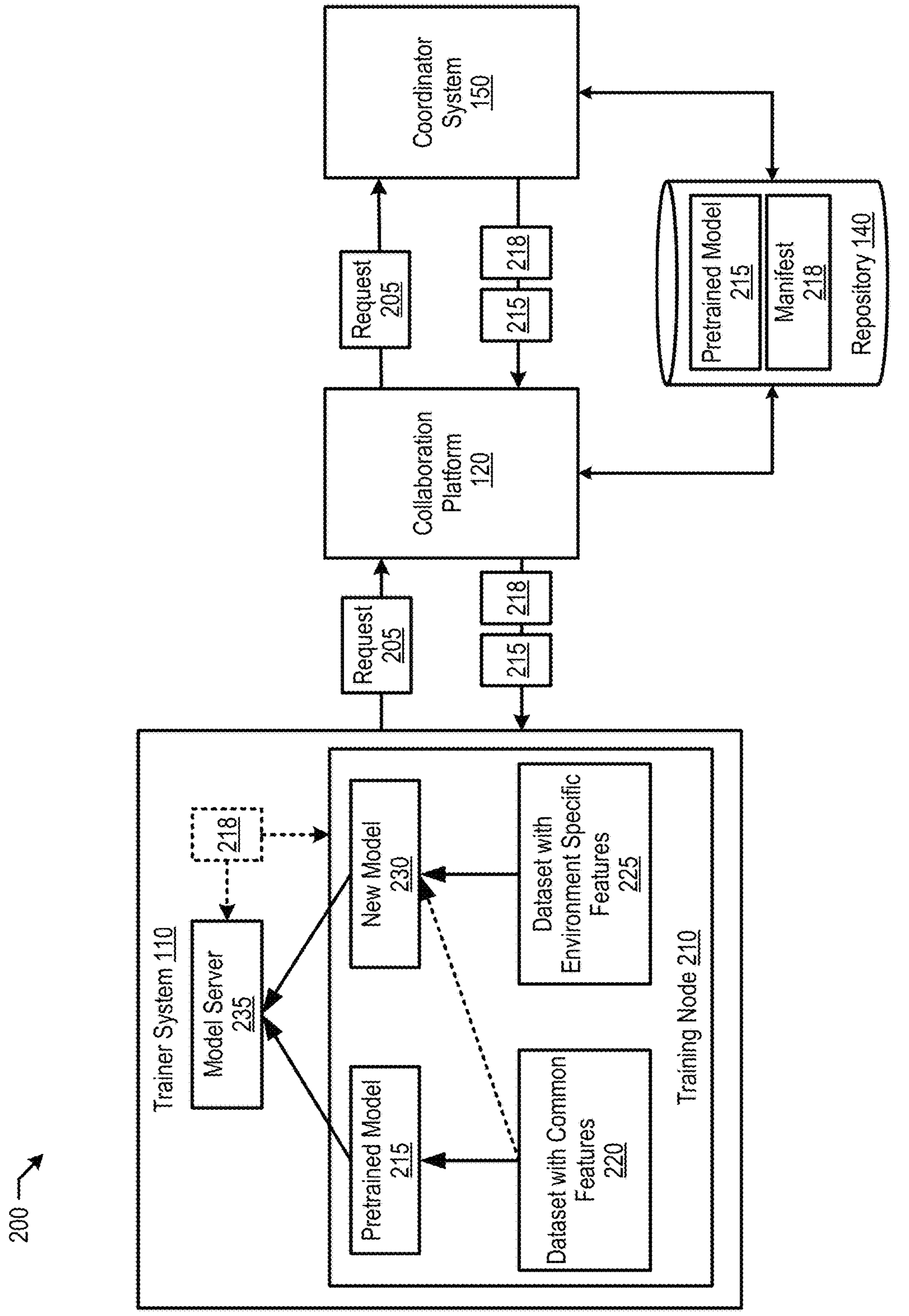
FIG. 2 is a is a block diagram that illustrates an example system for providing a ML model to a trainer system through a collaboration platform, and the trainer system training a new ML model using trainer-specific features, in accordance with some embodiments of the present disclosure.

FIG. 2 is a is a block diagram that illustrates an example system for providing a ML model to a trainer system through a collaboration platform, and the trainer system training a new ML model using trainer-specific features, in accordance with some embodiments of the present disclosure.

Trainer system 110 sends request 205 to collaboration platform 120. In some embodiments, request 205 is a GitHub pull request (GitHub PR). Collaboration platform 120 verifies trainer system 110 through, for example, GitHub level authentication. Once authenticated, trainer system 110's authentication keys are known to collaboration platform 120, and collaboration platform 120 uses the keys to decrypt request 205. Trainer system 110 creates a GitHub PR on the collaboration platform 120's repository (e.g., repository 140), detailing the runtime environment that will train the model. A GitHub repository, often referred to as a "repo," is a central storage location for code and project files on the GitHub platform. The GitHub repository is a version control repository that allows developers to store, collaborate on, and track changes to their codebase. GitHub repositories can host code for various programming languages and projects of different sizes and complexities.

Collaboration platform 120 responds to request 205 and provides pretrained model 215 and manifest 218. In some embodiments, manifest 218 is encrypted (as well as pretrained model 215) or signed by collaboration platform 120 that trainer system 110 can verify through its own supply chain security systems. Manifest 218 serves as a standardized document that facilitates model sharing, collaboration, and reproducibility. It provides a description of pretrained model 215's characteristics, making it easier for trainer system 110 to understand and utilize pretrained model 215 in training, projects, or systems. Moreover, manifest 218 serves as a reference point for model versioning, documentation, and tracking changes over time.

Trainer system 110 uses manifest 218 to set up model server 235 and training node 210. Trainer system 110, in some embodiments, decrypts pretrained model 215 and then validates pretrained model 215 using datasets with common features 220. Dataset with common features 220, for example, includes information that is publicly available and utilized to validate pretrained model 215. Trainer system 110 then trains new model 230 using dataset with common features 220 and dataset with environment specific features 225. Dataset with environment specific features 225 are special features uniquely known to trainer system 110 (e.g., new processor parameters). Model server 235 cross validates the accuracy of models 215 and 230 to filter unrelated or redundant features.

Figure 3:
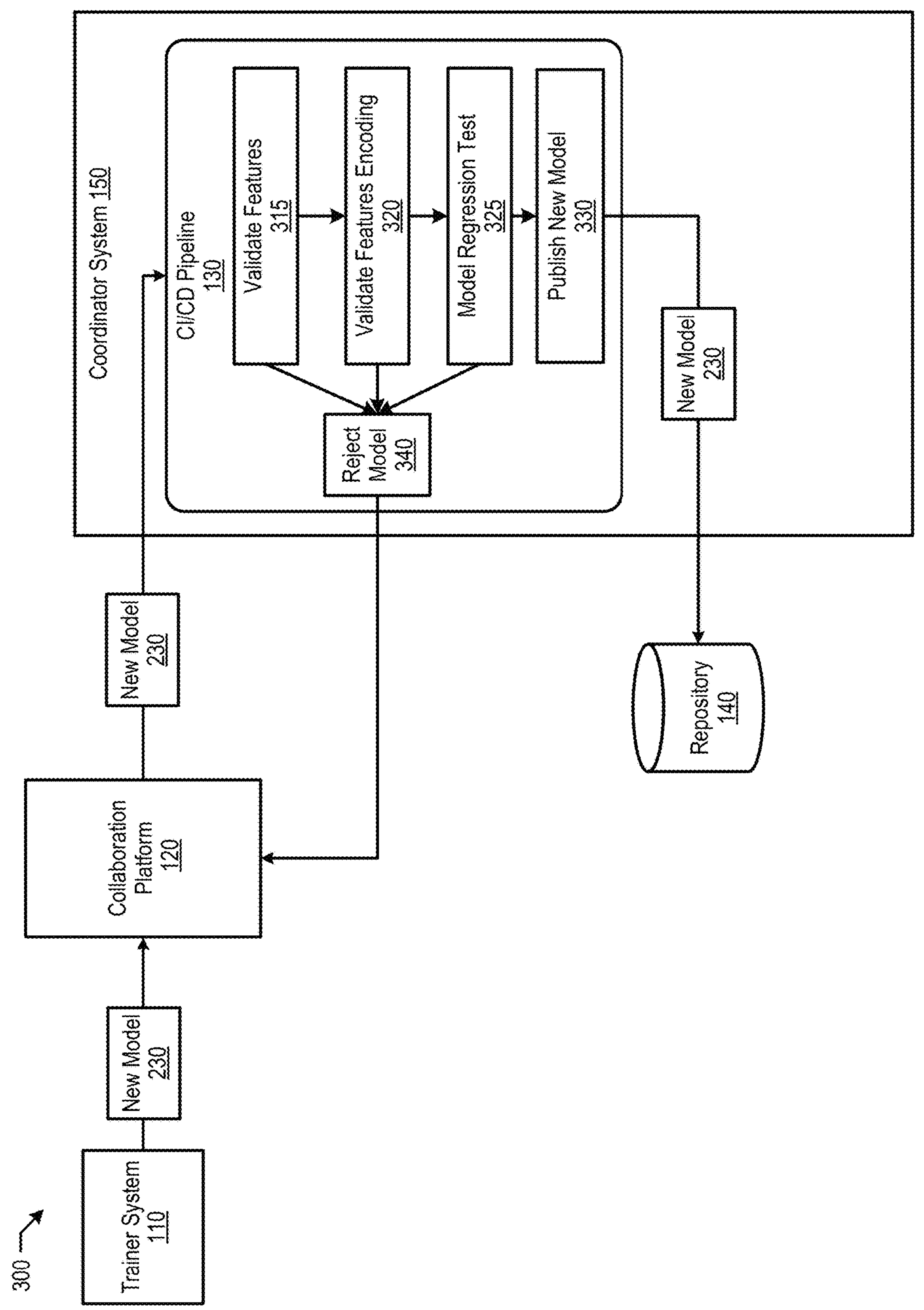
FIG. 3 is a block diagram that illustrates an example system for receiving a ML model from a collaboration platform, validating the ML model, and publishing the ML model based on the validation, in accordance with some embodiments of the present disclosure.

Once training finishes, trainer system 110 sends new model 230 to collaboration platform for validation and publication (see FIG. 3 and corresponding text for further details).

FIG. 3 is a block diagram that illustrates an example system for receiving a ML model from a collaboration platform, validating the ML model, and publishing the ML model based on the validation, in accordance with some embodiments of the present disclosure.

Continuous Integration and Continuous Deployment (CI/CD) pipeline 130 includes a set of automated operations 315-330 that facilitate the continuous integration and continuous deployment (delivery) of software applications. CI/CD pipeline 130 defines the workflow for building, testing, and deploying code changes from version control to production environments. The pipeline automates these steps to ensure efficient and reliable software delivery.

At operation 315, coordinator system 250 validates new features of new model 230. In some embodiments, this operation involves assessing the effectiveness and impact of incorporating these new features into the model's predictive capabilities. Operation 315 may include overfitting and regularization, A/B testing, interpretability and explainability, or a combination thereof. Overfitting and Regularization ensures that the inclusion of new features does not lead to overfitting, such as where new model 230 performs well on the training data but poorly on unseen data. Regularization techniques, such as L1 or L2 regularization, can help mitigate overfitting by controlling the model's complexity. A/B Testing compares the new features, if some are known, in new model 230 to pretrained model 215 to assess the incremental improvement achieved by incorporating the new features. Interpretability and explainability ensures that the new features contribute to new model 230's interpretability (and not degradation), and that their impact can be clearly understood and explained.

At operation 320, coordinator system 250 validates features encoding of new model 230, which involves assessing the effectiveness of encoding techniques applied to the features of the dataset. Feature encoding is the process of transforming categorical or textual features into numerical representations that ML models can understand and utilize effectively. In some embodiments, operation 320 may include one-hot encoding, label encoding, target encoding, or a combination thereof. One-hot encoding transforms each category into a binary vector and validates the one-hot encoding by checking if the encoded features capture the categorical information accurately. Label encoding maps each category to a numerical label and validates the label encoding by verifying that the numerical labels preserve the order or hierarchy, if applicable, and that the encoded values are meaningful to the model. Target encoding involves encoding categorical features based on the target variable's statistics, such as mean or frequency, to capture the relationship between the feature and the target, and validates the target encoding by analyzing if the encoded values reflect the relationship with the target and whether it helps improve the model's predictive performance.

At operation 325, coordinator system 250 performs model regression tests on new model 230, which involves assessing its performance and comparing it to a known baseline or a previously deployed model (e.g., pretrained model 215). Regression testing helps ensure that the new model retains or improves upon the performance of the existing model or a desired threshold. In some embodiments, operation 325 defines performance metrics, prepares a test dataset, collects baseline metrics, performs statistical comparisons, or a combination thereof. Defining performance metrics involves determining the appropriate metrics for evaluating the regression performance of the model. Common regression metrics may include mean squared error (MSE), root mean squared error (RMSE), mean absolute error (MAE), R-squared (coefficient of determination), or other domain-specific metrics. Preparing a test dataset involves preparing a separate test dataset that represents real-world data similar to the data new model 230 will encounter during deployment. Collecting baseline metrics involves collecting its regression performance metrics using the same test dataset. This serves as a reference point to evaluate the new model's performance. Statistical comparison involves performing statistical tests, such as t-tests or hypothesis testing, to determine if the performance differences between the new model and the baseline are statistically significant, which helps provide a quantitative assessment of the model's improvements or differences.

When new model 230 passes each of tests 315-325, coordinator system 250 publishes new model 230 at operation 330 and stores new model in repository 140. In some embodiments, when coordinator system 150, such as an orchestration engine, performs operation 330, coordinator system 150 makes new model 230 available for consumption by other systems, applications, or users.

Figure 4:
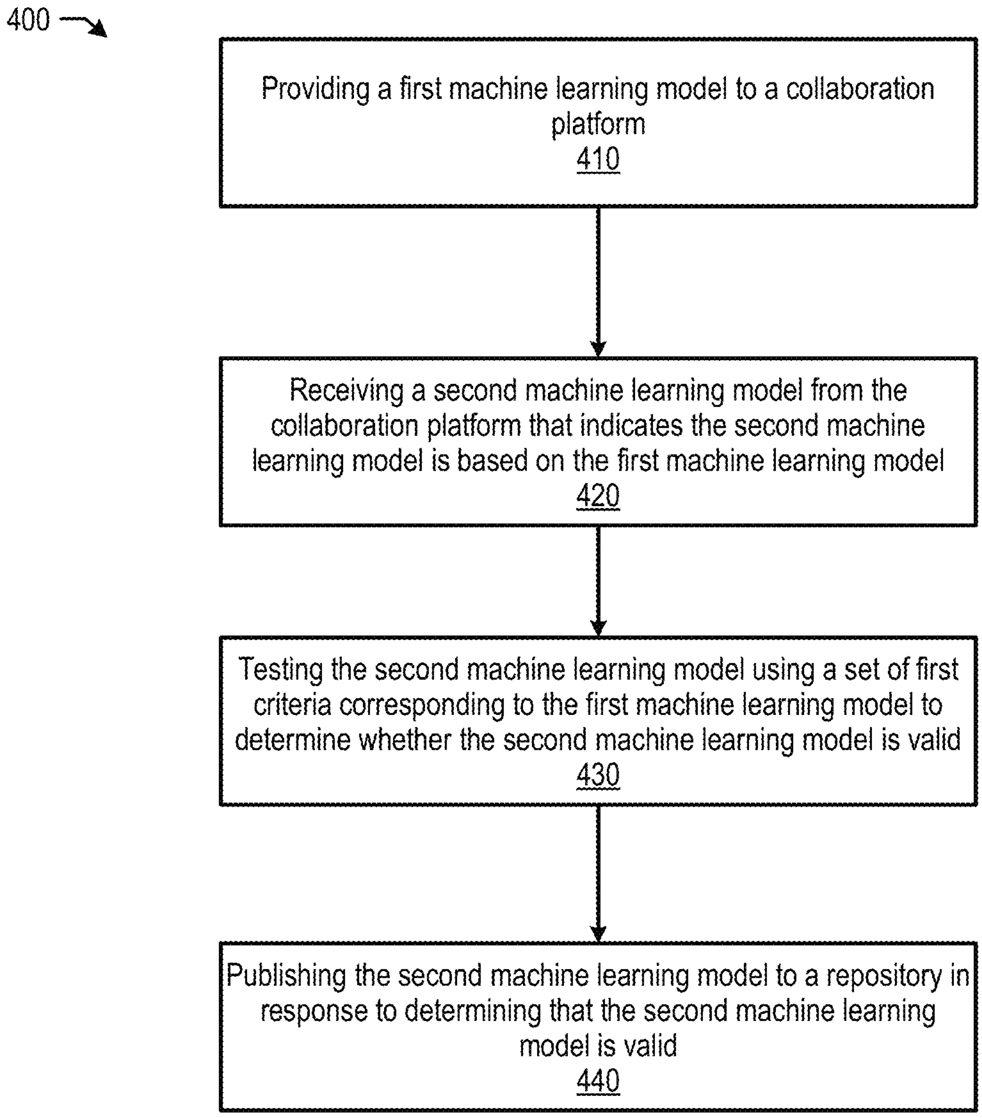
FIG. 4 is a flow diagram of a method for validating and publishing a ML model that was trained by an autonomous trainer system, in accordance with some embodiments of the present disclosure.

FIG. 4 is a flow diagram of a method for validating and publishing a ML model that was trained by an autonomous trainer system, in accordance with some embodiments of the present disclosure. Method 400 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by coordinator system 150 shown in FIGS. 1-3, processing device 520 shown in FIG. 5, processing device 602 shown in FIG. 6, or a combination thereof.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

With reference to FIG. 4, method 400 begins at block 410, where processing logic provides a first ML model to a collaboration platform. In some embodiments, the first ML model is trained prior to being provided to the collaboration platform, and processing logic provides a manifest corresponding to the first ML model to the collaboration platform. The manifest includes one or more training parameters for a trainer system to retrain the first ML model to produce the second ML model. In some embodiments, the one or more training parameters instruct the trainer system to validate the first ML model prior to retraining the first ML model.

At block 420, processing logic receives a second ML model from collaboration platform 120 that indicates the second ML model is based on the first ML model. In some embodiments, collaboration platform 120 is a GitHub platform that incorporates Git operations (GitOps) processes and the indication is based on version control from collaboration platform 120.

At block 430, processing logic tests the second ML model using criteria corresponding to the first ML model to determine whether the second ML model is valid. In some embodiments, processing logic transforms categorical data corresponding to the first ML model into one or more numerical representations. Processing logic then tests the second ML model using the one or more numerical representations to produce test results. In some embodiments, processing logic identifies the trainer system that produced the second ML model based on the test results.

At block 440, processing logic publishes the second ML model to a repository in response to determining that the second ML model is valid. In some embodiments, processing logic sends an error message to collaboration platform 120 when the second ML model is invalid.

Figure 5:
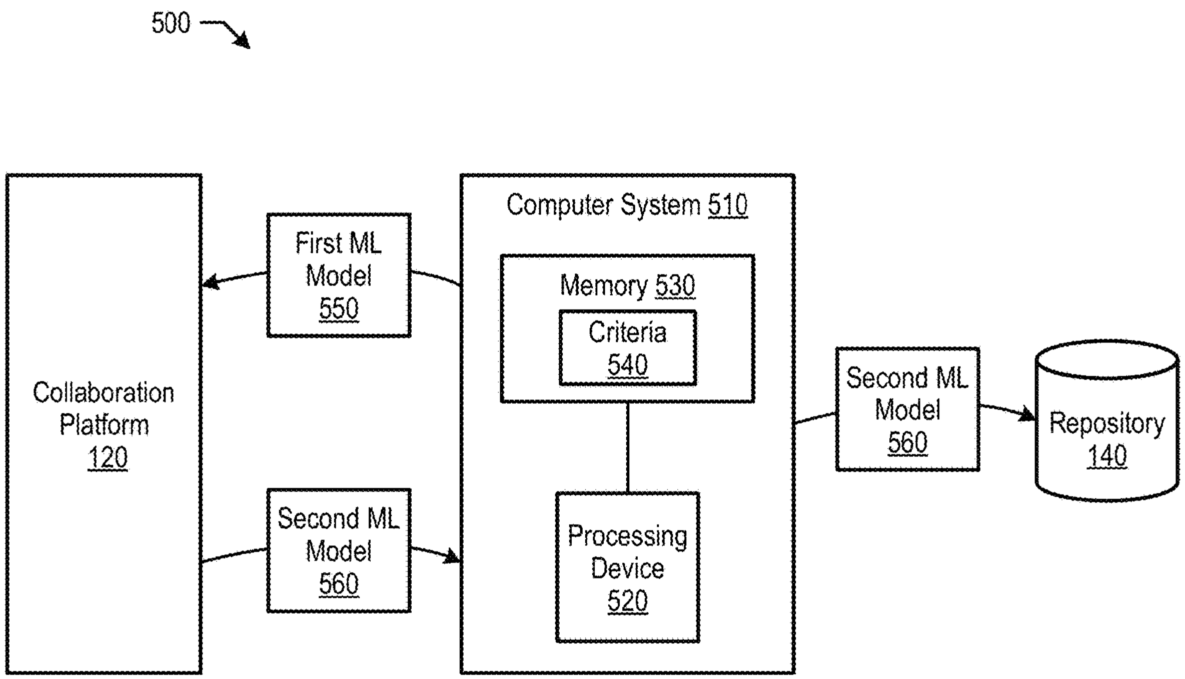
FIG. 5 is a block diagram that illustrates an example system for using verifiable machine learning operations (MLOps) to train ML models on autonomous environments, in accordance with some embodiments of the present disclosure.

FIG. 5 is a block diagram that illustrates an example system for using verifiable machine learning operations (MLOps) to train ML models on autonomous environments, in accordance with some embodiments of the present disclosure. Diagram 500 shows computer system 510, which includes processing device 520 and memory 530. Memory 530 stores criteria 540 and instructions that processing device 520 executes.

During execution, processing device 520 provides first ML model 550 to collaboration platform 120. Computer system 510 receives second ML model 560 from collaboration platform 120, and collaboration platform 120 indicates that second ML model 560 is based on first ML model 550. For example, collaboration platform 120 may be a GitHub platform and provides an indication based on its version control.

Processing device 520 tests second ML model 560 using criteria 540 corresponding to first ML model 550 to determine whether second ML model 560 is valid (see FIG. 3, operations 315-330 and corresponding text for further details). Then, processing device 520 publishes second ML model 560 to repository 140 in response to determining that second ML model 560 is valid.

Figure 6:
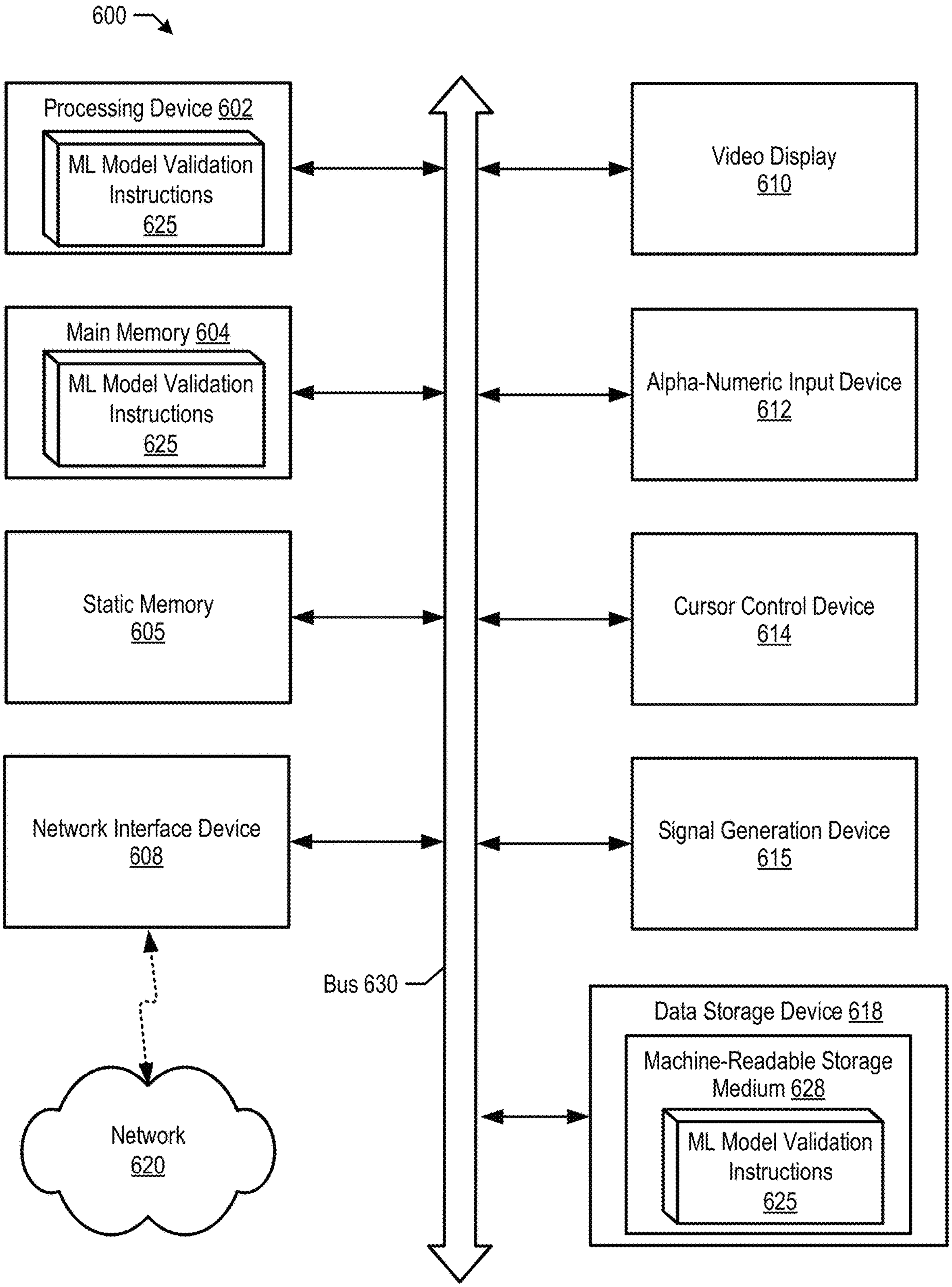
FIG. 6 illustrates a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for intelligently scheduling containers.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 600 may be representative of a server.

The exemplary computer system 600 includes a processing device 602, a main memory 604 (e.g., read-only memory (ROM), flash memory, dynamic random access memory (DRAM), a static memory 605 (e.g., flash memory, static random access memory (SRAM), etc.), and a data storage device 618 which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing system 600 may further include a network interface device 608 which may communicate with a network 620. The computing system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 615 (e.g., a speaker). In some embodiments, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute ML model validation instructions 625, for performing the operations and steps discussed herein.

The data storage device 618 may include a machine-readable storage medium 628, on which is stored one or more sets of ML model validation instructions 625 (e.g., software) embodying any one or more of the methodologies of functions described herein. The ML model validation instructions 625 may also reside, completely or at least partially, within the main memory 604 or within the processing device 602 during execution thereof by the computer system 600; the main memory 604 and the processing device 602 also constituting machine-readable storage media. The ML model validation instructions 625 may further be transmitted or received over a network 620 via the network interface device 608.

The machine-readable storage medium 628 may also be used to store instructions to perform a method for intelligently scheduling containers, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "providing," "receiving," "testing," "publishing," "transforming," "identifying," "sending," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112 (f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:

providing, by a coordinator system operating in a first environment, a first machine learning model to a collaboration platform;

receiving a second machine learning model from the collaboration platform that indicates the second machine learning model is based on the first machine learning model, wherein the first machine learning model was retrained by a trainer system operating in a second environment, autonomous from the first environment, to produce the second machine learning model;

testing, by a processing device of the coordinator system, the second machine learning model using criteria corresponding to the first machine learning model to determine whether the second machine learning model is valid; and publishing the second machine learning model to a repository in response to determining that the second machine learning model is valid.

2. The method of claim 1, wherein the first machine learning model is trained prior to being provided to the collaboration platform, the method further comprising:

providing a manifest corresponding to the first machine learning model to the collaboration platform, wherein the manifest comprises one or more training parameters for the trainer system to retrain the first machine learning model to produce the second machine learning model.

3. The method of claim 2, wherein the one or more training parameters instruct the trainer system to validate the first machine learning model prior to retraining the first machine learning model, and wherein the second machine learning model is based on a dataset with environment specific features of the trainer system.

4. The method of claim 2, wherein the coordinator system and the trainer system are controlled by separate entities.

5. The method of claim 1, wherein the testing further comprises: transforming categorical data corresponding to the first machine learning model into one or more numerical representations; testing the second machine learning model using the one or more numerical representations to produce test results; and identifying, based on the test results, the trainer system that produced the second machine learning model.

6. The method of claim 1, further comprising:

in response to determining that the second machine learning model is invalid, sending an error message to the collaboration platform.

7. The method of claim 1, wherein the method incorporates machine learning operations (MLOps), and wherein the collaboration platform is a GitHub platform that incorporates Git operations (GitOps).

8. A system comprising:

a processing device; and a memory to store instructions that, when executed by the processing device cause the processing device, operating in a first environment, to:

provide a first machine learning model to a collaboration platform;

receive a second machine learning model from the collaboration platform that indicates the second machine learning model is based on the first machine learning model, wherein the first machine learning model was retrained by a trainer system operating in a second environment, autonomous from the first environment, to produce the second machine learning model;

test, by the processing device, the second machine learning model using criteria corresponding to the first machine learning model to determine whether the second machine learning model is valid; and publish the second machine learning model to a repository in response to determining that the second machine learning model is valid.

9. The system of claim 8, wherein the first machine learning model is trained prior to being provided to the collaboration platform, and wherein the processing device, responsive to executing the instructions, further causes the system to:

provide a manifest corresponding to the first machine learning model to the collaboration platform, wherein the manifest comprises one or more training parameters for the trainer system to retrain the first machine learning model to produce the second machine learning model.

10. The system of claim 9, wherein the one or more training parameters instruct the trainer system to validate the first machine learning model prior to retraining the first machine learning model, and wherein the second machine learning model is based on a dataset with environment specific features of the trainer system.

11. The system of claim 9, wherein the system is a coordinator system, and wherein the coordinator system and the trainer system are controlled by separate entities.

12. The system of claim 8, wherein the processing device, responsive to executing the instructions, further causes the system to: transform categorical data corresponding to the first machine learning model into one or more numerical representations; test the second machine learning model using the one or more numerical representations to produce test results; and identify, based on the test results, the trainer system that produced the second machine learning model.

13. The system of claim 8, wherein the processing device, responsive to executing the instructions, further causes the system to:

send an error message to the collaboration platform in response to the second machine learning model being determined to be invalid.

14. The system of claim 8, wherein the system incorporates machine learning operations (MLOps), and wherein the collaboration platform is a GitHub platform that incorporates Git operations (GitOps).

15. A non-transitory computer readable medium, having instructions stored thereon which, when executed by a processing device, cause the processing device, operating in a first environment, to:

provide a first machine learning model to a collaboration platform;

receive a second machine learning model from the collaboration platform that indicates the second machine learning model is based on the first machine learning model, wherein the first machine learning model was retrained by a trainer system operating in a second environment, autonomous from the first environment, to produce the second machine learning model;

test, by the processing device, the second machine learning model using criteria corresponding to the first machine learning model to determine whether the second machine learning model is valid; and publish the second machine learning model to a repository in response to determining that the second machine learning model is valid.

16. The non-transitory computer readable medium of claim 15, wherein the first machine learning model is trained prior to being provided to the collaboration platform, and wherein the processing device is to:

provide a manifest corresponding to the first machine learning model to the collaboration platform, wherein the manifest comprises one or more training parameters for the trainer system to retrain the first machine learning model to produce the second machine learning model.

17. The non-transitory computer readable medium of claim 16, wherein the one or more training parameters instruct the trainer system to validate the first machine learning model prior to retraining the first machine learning model, and wherein the second machine learning model is based on a dataset with environment specific features of the trainer system.

18. The non-transitory computer readable medium of claim 16, wherein the processing device executes on a coordinator system, and wherein the coordinator system and the trainer system are controlled by separate entities.

19. The non-transitory computer readable medium of claim 15, wherein the processing device is to: transform categorical data corresponding to the first machine learning model into one or more numerical representations; test the second machine learning model using the one or more numerical representations to produce test results; and identify, based on the test results, the trainer system that produced the second machine learning model.

20. The non-transitory computer readable medium of claim 15, wherein the processing device is to:

send an error message to the collaboration platform in response to the second machine learning model being determined to be invalid.

* * * * *